United States Patent
Ishihara et al.

(10) Patent No.: US 6,636,876 B1
(45) Date of Patent: *Oct. 21, 2003

(54) DATABASE COPY APPARATUS, DATABASE COPY METHOD AND RECORDING MEDIUM RECORDED WITH DATABASE COPY PROGRAM

(75) Inventors: Kazuo Ishihara, Kawasaki (JP); Hisayuki Enbutsu, Kawasaki (JP); Mitsuhide Nishino, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,935

(22) Filed: Oct. 27, 1999

(30) Foreign Application Priority Data

May 28, 1999 (JP) ............................................. 11-149231

(51) Int. Cl.[7] ............................................. G06F 17/30
(52) U.S. Cl. ............................. 707/202; 707/3; 707/204
(58) Field of Search ................................. 707/202, 204, 707/3, 100; 714/11, 13, 6

(56) References Cited

U.S. PATENT DOCUMENTS 5,970,502 A * 10/1999 Salkewicz et al. .......... 707/201
6,023,707 A * 2/2000 Hamada et al. ............. 707/202
6,026,398 A * 2/2000 Brown et al. ............... 227/156
6,424,969 B1 * 7/2002 Gruenwald .................. 707/100

FOREIGN PATENT DOCUMENTS

JP          10-207754          8/1998

OTHER PUBLICATIONS

Iwaihara et al., "Navigation and schema transformations for producing nested relations from networks", IEEE, pp. 181–190, 1991.*

* cited by examiner

Primary Examiner—Jean M. Corrielus
(74) Attorney, Agent, or Firm—Staas & Halsey LLP

(57) ABSTRACT

A database copy apparatus, a database copy method and a recording medium recorded with a database copy program, which increases the generality of database copying irrespective of the database structure, by partitioning a copy source database into predetermined regions, and copying records and inter-record connection relations contained in the respective regions to a copy target database, and extracting from the copy source database the inter-record connection relations respectively contained in different regions, and duplicating the inter-record connection relations copied to the copy target database, based on the extracted connection relations.

9 Claims, 21 Drawing Sheets

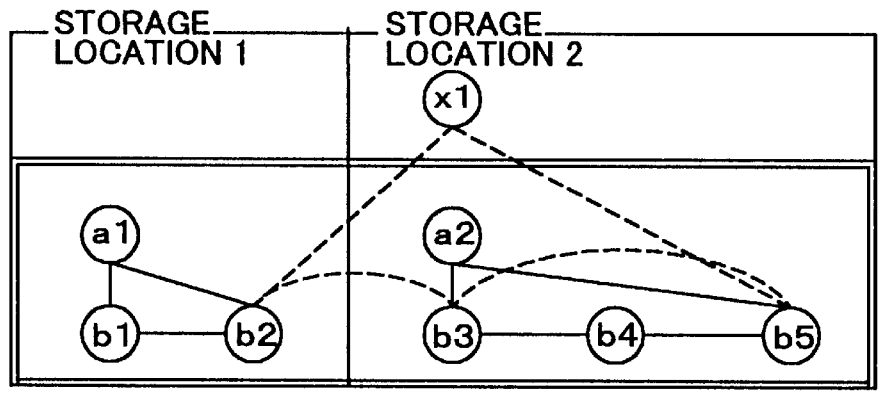

(B)
```
┌─ EXTRACTION DATA ─────────────┐
│ STORAGE LOCATION 1            │
│ RECORD                        │
│   a1, b1, b2                  │
│ SOLVED SET INFORMATION        │
│   a1→b1→b2→a1                 │
│ UNSOLVED SET INFORMATION      │
│   b2→b3                       │
│ STORAGE LOCATION 2            │
│ RECORD                        │
│   x1,                         │
│   a2, b3, b4, b5              │
│ SOLVED SET INFORMATION        │
│   a2→b3→b4→b5→a2              │
│ UNSOLVED SET INFORMATION      │
│   x1→b2                       │
│   b3→b5                       │
│   b5→x1                       │
└───────────────────────────────┘
```

(C)
```
┌─ SET TABLE ─┐
│   b2→b3     │
│   x1→b2     │
│   b3→b5     │
│   b5→x1     │
└─────────────┘
```

(D)

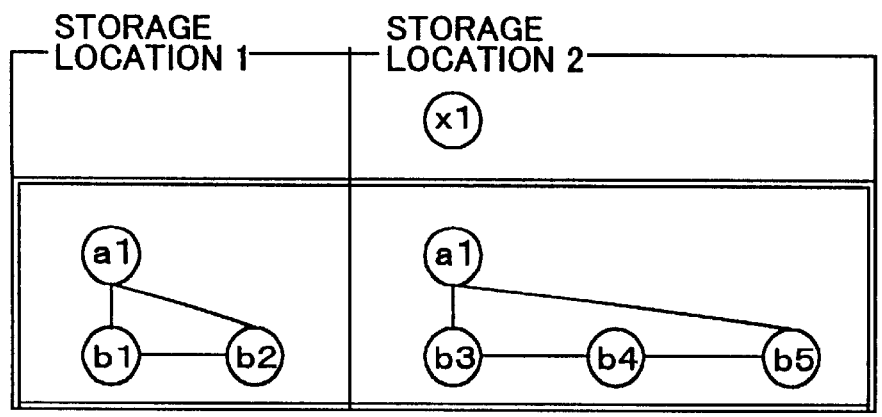

FIG.2
(A)
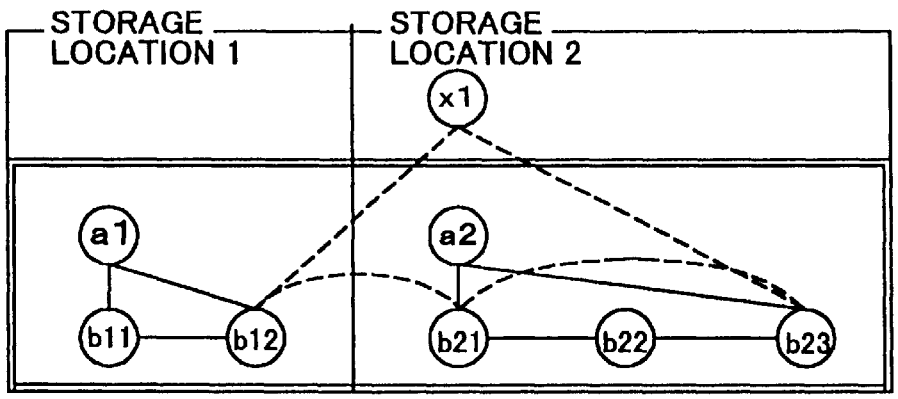
(B)
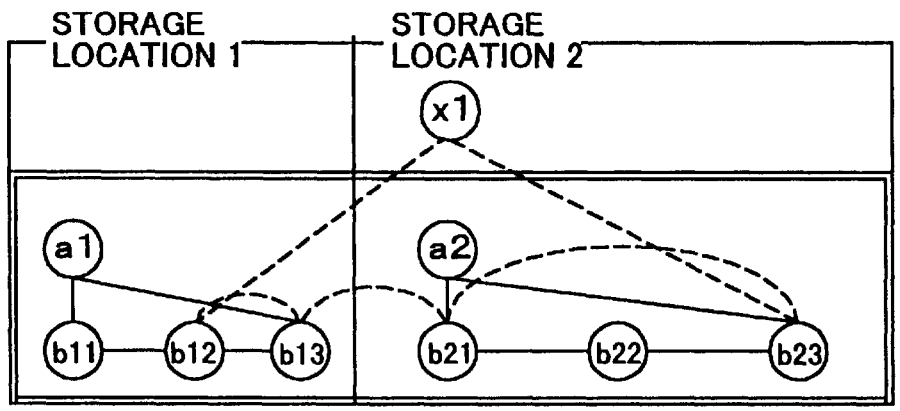
(C)
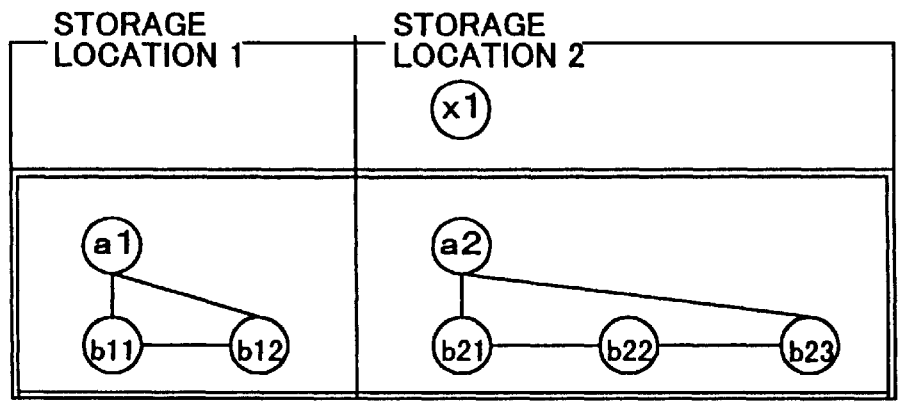
(D)
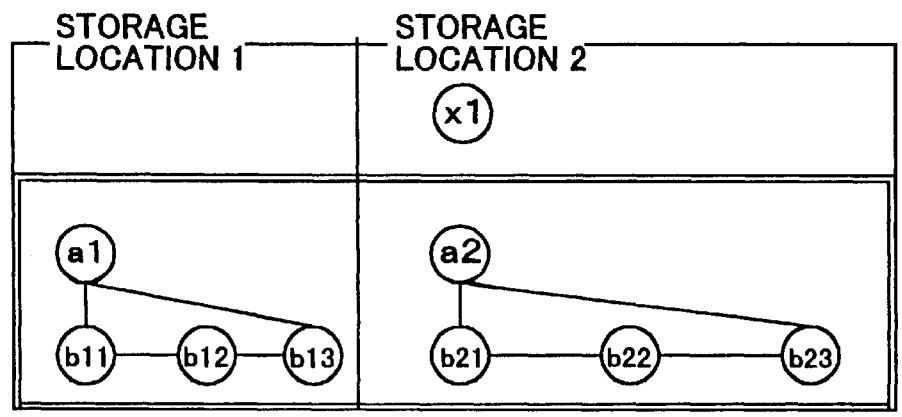

```
┌─EXTRACTION DATA─────┐
│  STORAGE LOCATION 1 │
│  RECORD             │
│    a1, b11, b12     │
│  SOLVED SET INFORMATION │
│    a1→b11→b12→a1    │
│  UNSOLVED SET INFORMATION │
│    b12→b21          │
│  STORAGE LOCATION 2 │
│  RECORD             │
│    x1,              │
│    a2, b21, b22, b23│
│  SOLVED SET INFORMATION │
│    a2→b21→b22→b23→a2│
│  UNSOLVED SET INFORMATION │
│    x1→b12           │
│    b21→b23          │
│    b23→x1           │
└─────────────────────┘
```

(B)

```
┌─EXTRACTION DATA─────┐
│ DB UPDATE(ADDITION) │
│    b13              │
│ UNSOLVED SET INFORMATION │
│    b12→b13          │
│    b13→b21          │
│                     │
└─────────────────────┘
```

(C)

```
┌─ SET TABLE ─┐
│   b12→b21   │
│   x1→b12    │
│   b21→b23   │
│   b23→x1    │
└─────────────┘
```

(D)

```
┌─ SET TABLE ─┐
│   b12→b13   │
│   b13→b21   │
│   x1→b12    │
│   b21→b23   │
│   b23→x1    │
└─────────────┘
```

FIG.4
(A)
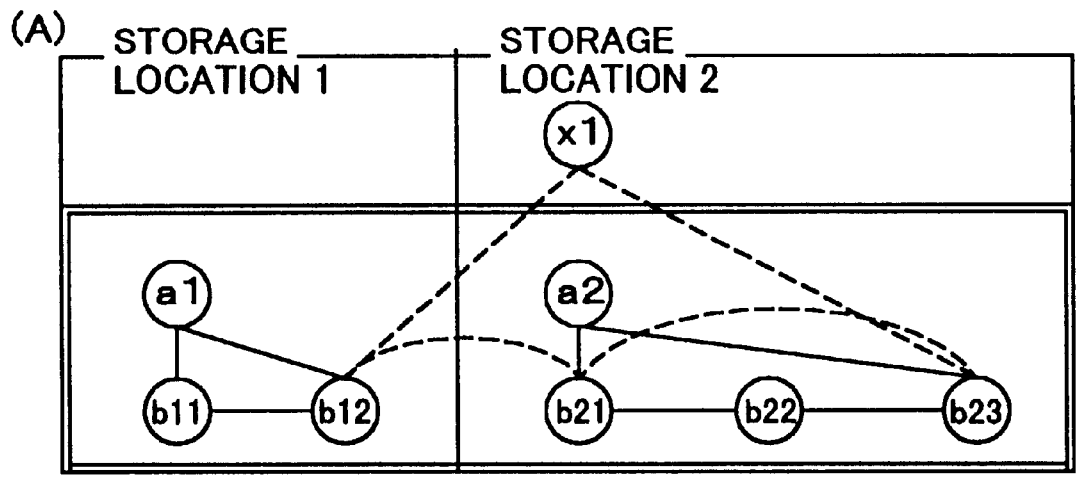
(B)
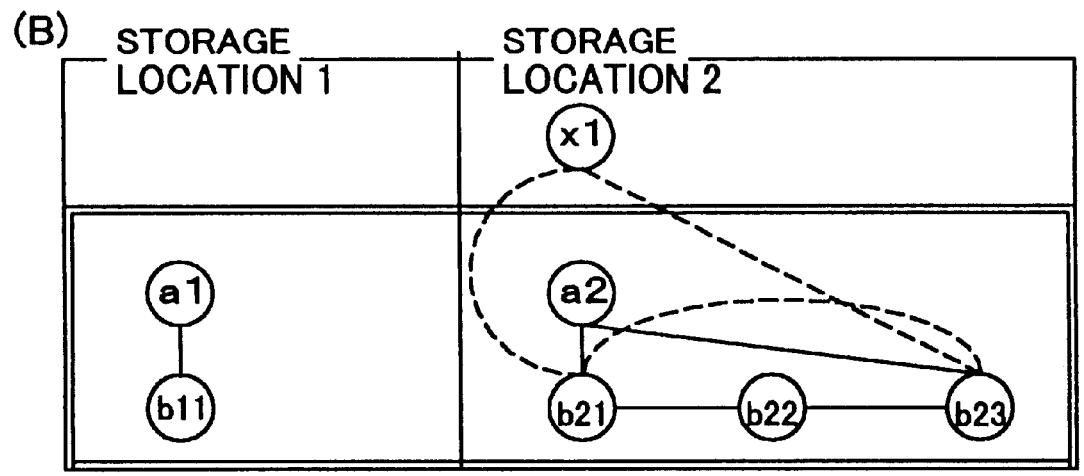

FIG.5
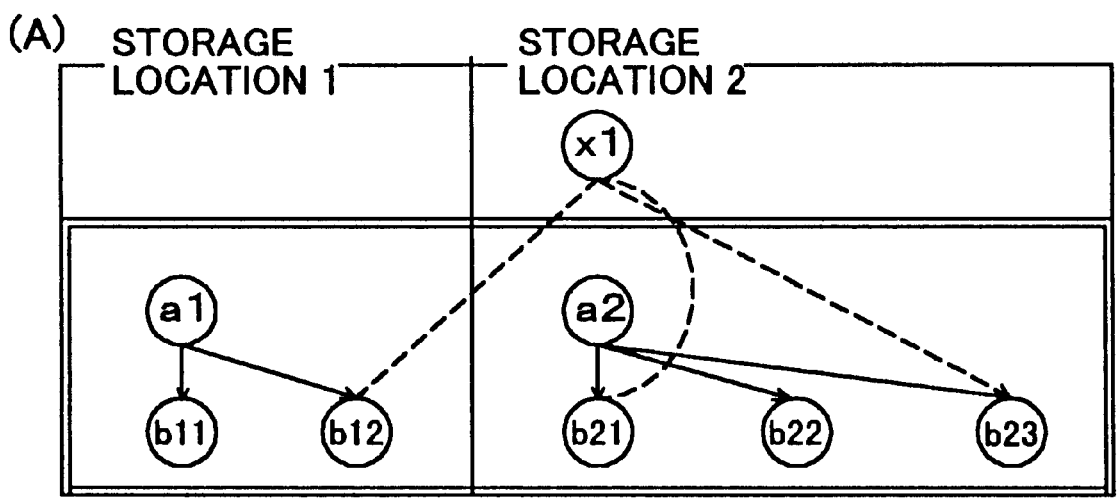
(A)
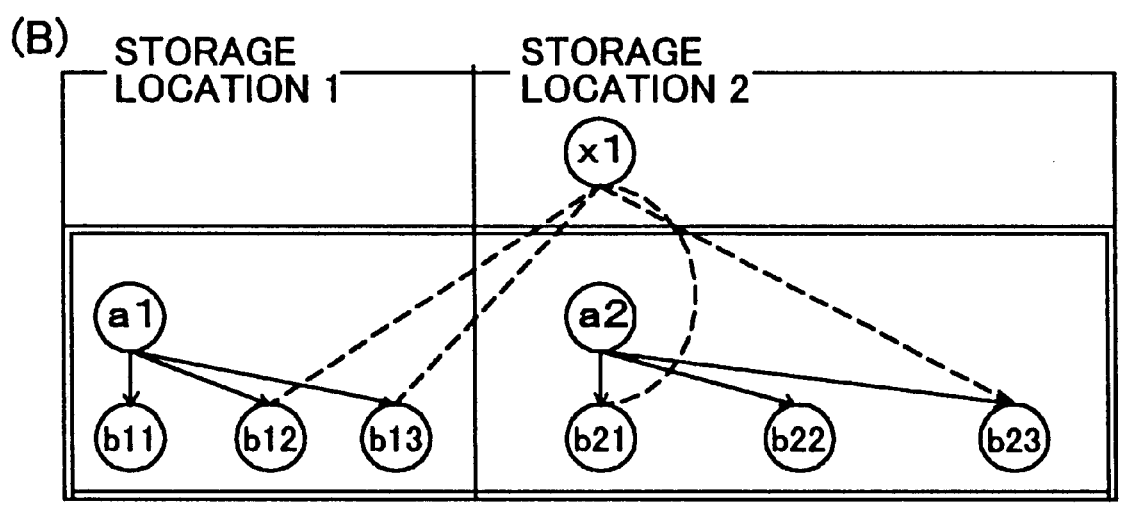
(B)

FIG.6
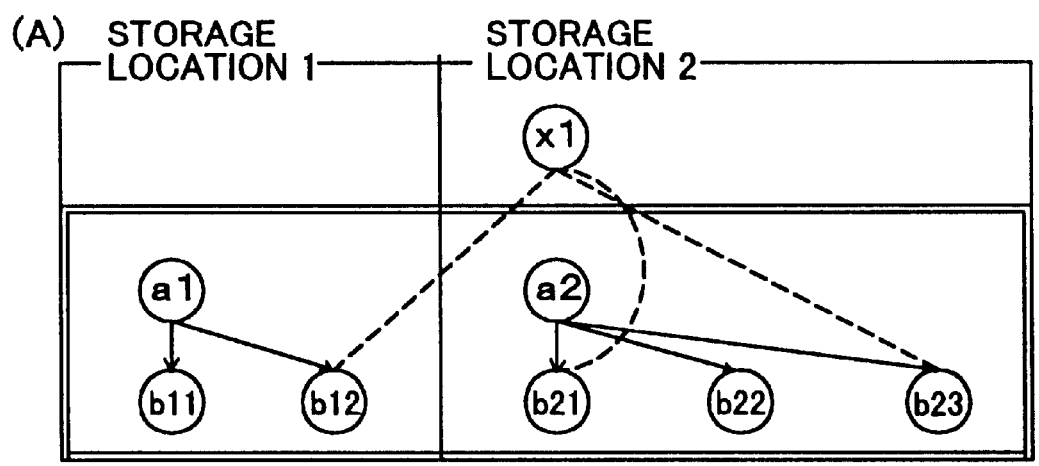
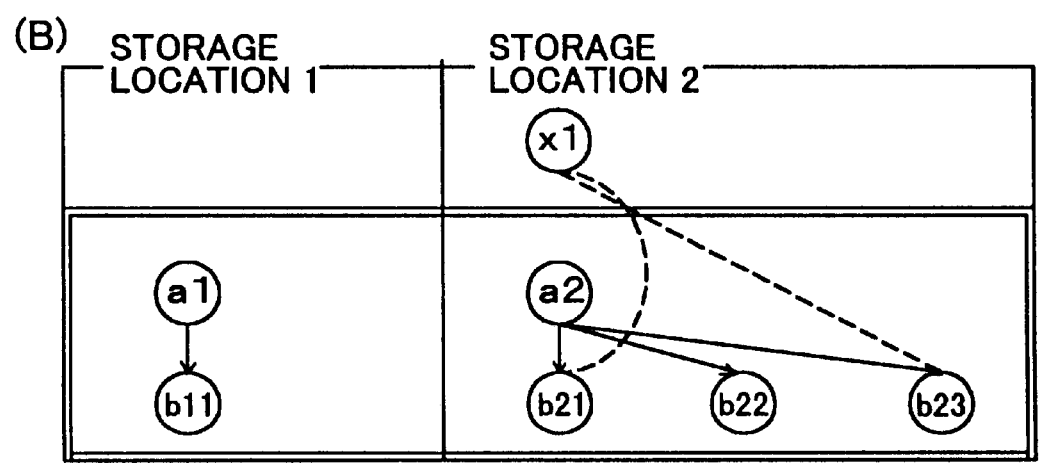

FIG.12

| | | |
|---|---|---|
| CLASSIFICATION=RECORD | a1 | a1 ADDRESS |
| CLASSIFICATION=RECORD | b11 | b11 ADDRESS |
| CLASSIFICATION=RECORD | b12 | b12 ADDRESS |
| CLASSIFICATION=UNSOLVED SET INFORMATION | b12 ADDRESS | b21 ADDRESS |
| CLASSIFICATION=RECORD | x1 | x1 ADDRESS |
| CLASSIFICATION=RECORD | a2 | a2 ADDRESS |
| CLASSIFICATION=RECORD | a21 | a21 ADDRESS |
| CLASSIFICATION=RECORD | a22 | a22 ADDRESS |
| CLASSIFICATION=RECORD | a23 | a23 ADDRESS |
| CLASSIFICATION=UNSOLVED SET INFORMATION | x1 ADDRESS | b12 ADDRESS |
| CLASSIFICATION=UNSOLVED SET INFORMATION | b21 ADDRESS | b23 ADDRESS |
| CLASSIFICATION=UNSOLVED SET INFORMATION | b23 ADDRESS | x1 ADDRESS |

FIG.14

| COPY SOURCE DB ADDRESS | COPY TARGET DB ADDRESS | UNSOLVED SET INFORMATION |
|---|---|---|
| b11 ADDRESS | b11 ADDRESS | — |
| b12 ADDRESS | b12 ADDRESS | COPY SOURCE DB b21 ADDRESS |
| x1 ADDRESS | x1 ADDRESS | COPY SOURCE DB b12 ADDRESS |
| b21 ADDRESS | b21 ADDRESS | COPY SOURCE DB b23 ADDRESS |
| b22 ADDRESS | b22 ADDRESS | — |
| b23 ADDRESS | b23 ADDRESS | COPY SOURCE DB X1 ADDRESS |

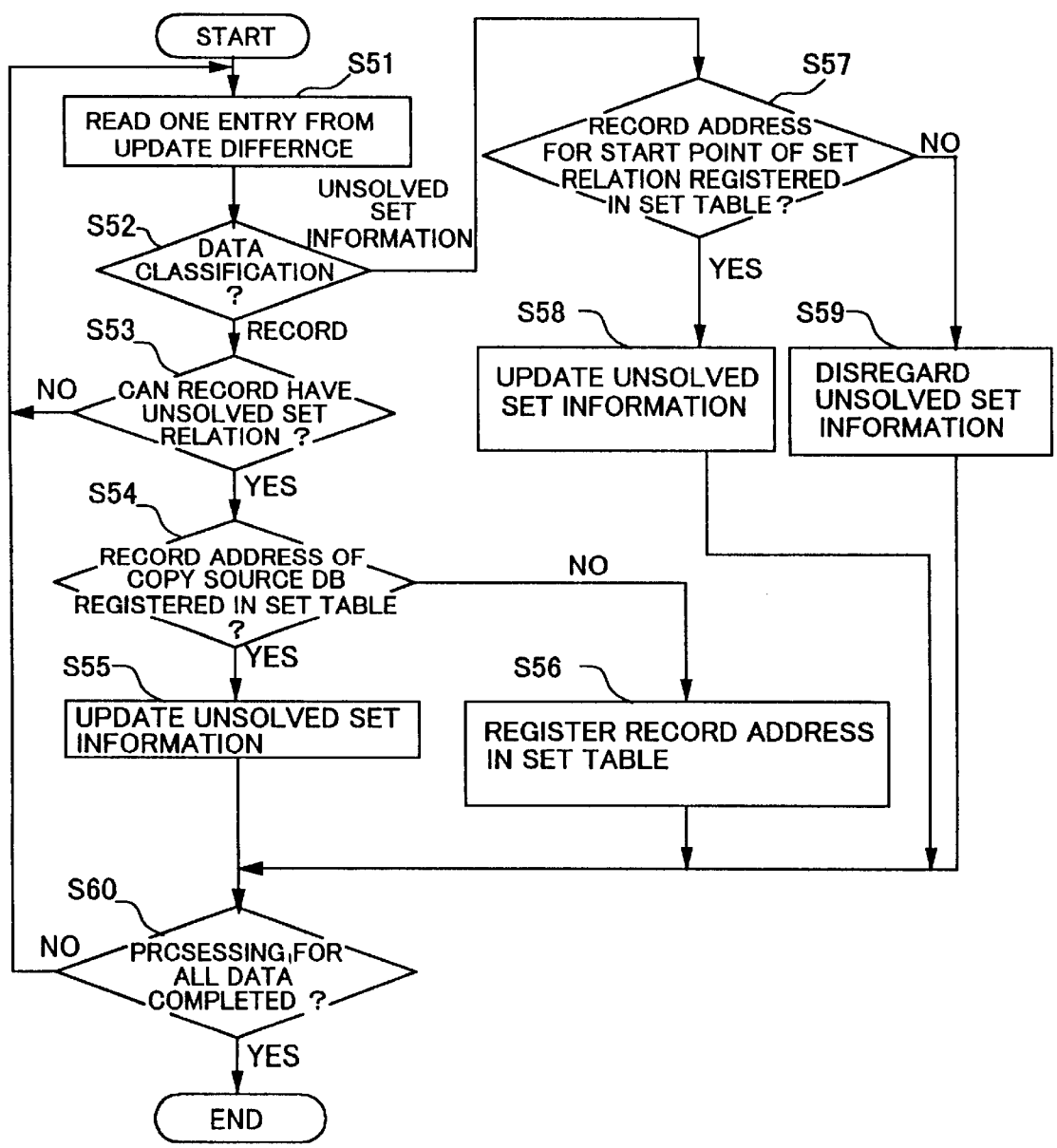

FIG.18

| COPY SOURCE DB ADDRESS | COPY TARGET DB ADDRESS | UNSOLVED SET INFORMATION |
|---|---|---|
| b11 ADDRESS | b11 ADDRESS | — |
| b12 ADDRESS | b12 ADDRESS | COPY SOURCE DB b13 ADDRESS |
| x1 ADDRESS | x1 ADDRESS | COPY SOURCE DB b12 ADDRESS |
| b21 ADDRESS | b21 ADDRESS | COPY SOURCE DB b23 ADDRESS |
| b22 ADDRESS | b22 ADDRESS | — |
| b23 ADDRESS | b23 ADDRESS | COPY SOURCE DB x1 ADDRESS |
| b13 ADDRESS | b13 ADDRESS | COPY SOURCE DB b21 ADDRESS |

FIG.22
(A)
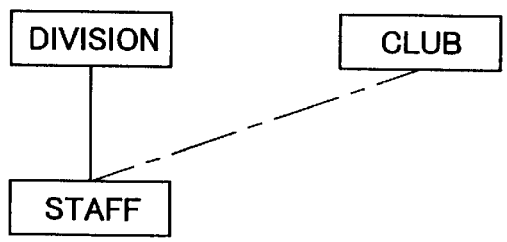
(B)
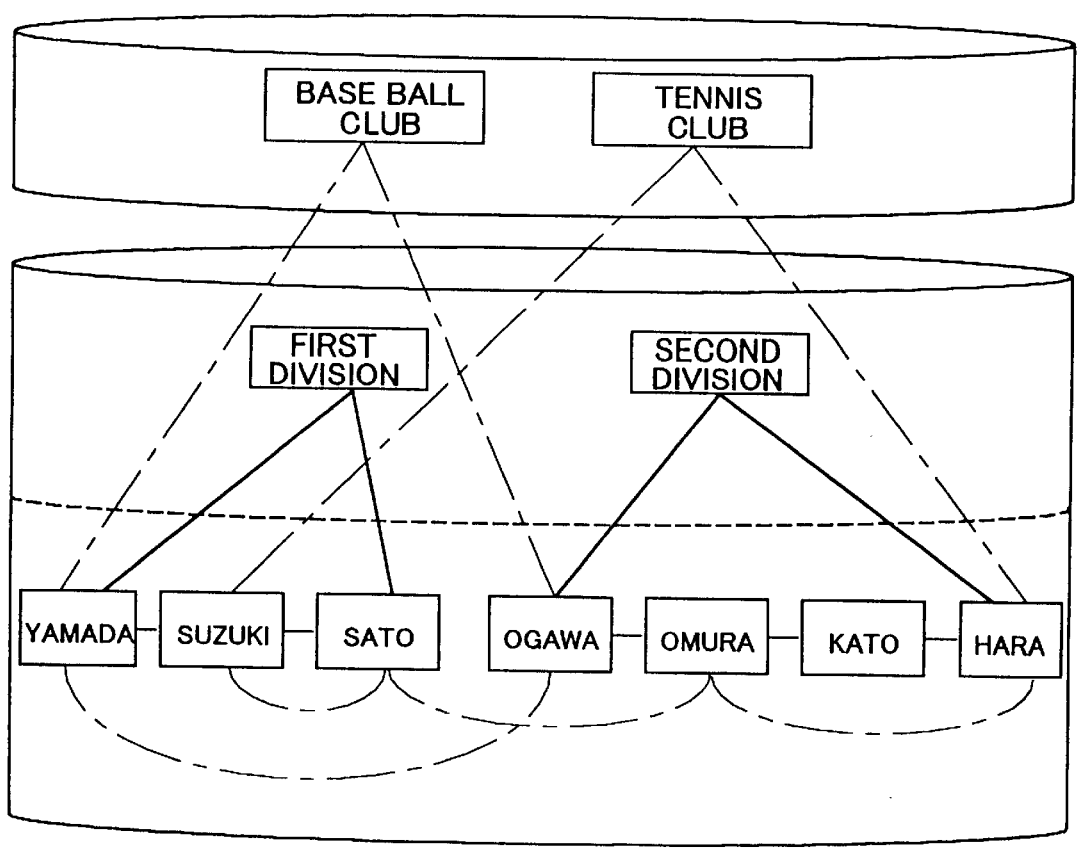

FIG.23
(A)
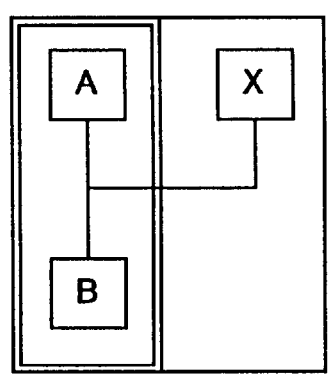
(B)
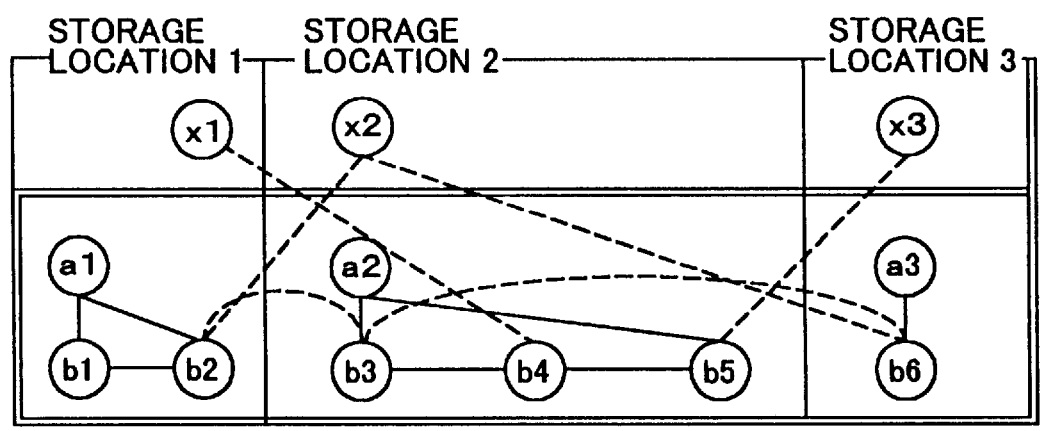

_DATABASE COPY APPARATUS, DATABASE COPY METHOD AND RECORDING MEDIUM RECORDED WITH DATABASE COPY PROGRAM_

BACKGROUND OF THE INVENTION

1. Field of the Invention

The present invention relates to database copying technology, and in particular to technology for increasing generality.

2. Description of the Related Art

Recently with the internationalization of business and 24 hour services, there has been an increase in the requirement for non-stop operation of computer systems for executing application programs.

With computer systems, for maintenance of hardware and the like it is necessary to stop the system. With the non-stop operation of computer systems however, since the system cannot be stopped, then maintenance cannot be performed. Therefore, an operation mode has been considered where two sets of computer systems are prepared, and maintenance is performed by alternately switching operation to thereby stop one system.

However, since the maintenance operation also includes maintenance of the disk unit, the same disk unit cannot be shared between the two computer systems. Consequently, it is necessary to have a separate disk unit for each system, and at the time of operation switching, it is necessary to copy the database (referred to hereunder as DB). With the database copying, this must be at a sufficient speed to the extent that the service for the computer system user is not stopped.

To address this problem, the present inventors have proposed a copy method for an update system database (refer to Japanese Unexamined Patent Publication No. 10-207754). With this technique, only when the database is updated by the application program with respect to data which has been extracted, is the equivalence of the DB acquiring and reflecting the update difference guaranteed. Then, at the time of data extraction, the range to be extracted is exclusively occupied, and the records within this range and the inter-record connection relations (referred to hereunder as set relations) are extracted at a time.

However, depending on the DB construction, the set relations may extend over the whole DB, so that there is the possibility of the following deficiency. That is to say, in the case where the set relations extend over the whole DB, the whole DB is exclusively occupied and the data extracted. Hence in practice, DB updating becomes impossible. Consequently, with the conventional technology, there is a restriction on the DB construction in relation to copying of the DB, so that the generality drops.

SUMMARY OF THE INVENTION

The present invention takes into consideration the heretofore problems, with the object of providing a database copying technique with increased generality, which efficiently performs DB copying irrespective of the DB structure.

Furthermore, it is an object to distribute a recording medium recorded with a database copying program according to the present invention, so that a person acquiring the recording medium can easily construct a database copy apparatus.

For achieving the above objects, a first solution device is characterized in that a database copy apparatus comprises: a data copying device for partitioning a copy source database into predetermined regions, and copying records and inter-record connection relations contained in the respective regions to a copy target database; a connection relations extraction device for extracting from the copy source database the inter-record connection relations respectively contained in different regions; and a connection relations duplication device for duplicating the inter-record connection relations copied to the copy target database by the data copying device, based on the connection relations extracted by the connection relations extraction device.

With such a construction, copying of the database is performed as follows.

(1) The copy source database is partitioned into predetermined regions, and the records and the inter-record connection relations contained in the respective regions are copied to the copy target database.

(2) The inter-record connection relations respectively contained in different regions are extracted from the copy source database.

(3) The inter-record connection relations copied to the copy target database are duplicated based on the extracted connection relations.

Consequently, even when the inter-record connection relations extend to the whole database, the database copying for the partitioned region units is performed, after which the inter-record connection relations respectively contained in the different regions are duplicated. Therefore, the exclusive occupation of the database spanning a wide range as with the conventional technology becomes unnecessary, so that for example it becomes possible to perform database copying during operation of an on line system. Moreover, database copying can be efficiently performed irrespective of the database construction, so that generality related to database copying can be increased.

Furthermore, the construction may comprise: an update difference acquisition device for acquiring, when there is a database update request for the region of the copy source database in which the records and the inter-record connection relations have been copied by the data copying device, an update difference due to the database update request; a data update device for updating records and inter-record connection relations which have been copied to the copy target database by the data copying device, based on the update difference acquired by the update difference acquisition device; and a connection relations update device for updating connection relations extracted by the connection relations extraction device, based on the update difference acquired by the update difference acquisition device.

With such a construction, when there is a database update request for the region of the copy source database in which the records and the inter-record connection relations have been copied, the update difference due to the database update request is acquired. That is to say, even if updating is performed with respect to the region in which the records and the like in the copy source database have already been copied, since that updating is not reflected in the copy target database, then the update difference is acquired. Then based on the acquired update difference, the records and the inter-record connection relations copied to the copy target database, and the inter-record connection relations respectively contained in the different regions are updated. After this, based on the inter-record connection relations contained in the updated different regions, the inter-record connection relations copied to the copy target database are duplicated. Consequently, even during database copying, it is possible for example to process database update requests from an application program, thus enabling application to various on line systems.

Moreover, the construction may be such that there is provided; a processing completion judgment device for judging if processing of the copy source database by the data copying device and the connection relations extraction device has been completed, and, when there is a database update request of the copy source database in which the records and the inter-record connection relations have been copied by the data copying device, an update difference acquisition device for acquiring the update difference due to the database update request and the connection relations duplication device, when judged by the processing completion judgment device that the processing of the copy source database has been completed, duplicates and updates the inter-record connection relations copied to the copy target database by the data copying device, based on the connection relations extracted by the connection relations extraction device and the update difference acquired by the update difference acquisition device.

With such a construction, when there is a database update request for the region of the copy source database in which the records and the inter-record connection relations have been copied, the update difference due to the database update request is acquired. Then, when the processing of the copy source database has been completed, the inter-record connection relations copied to the copy target database are duplicated and updated based on the connection relations and the update difference. Consequently, the update processing for the extracted connection relations becomes unnecessary, enabling a further improvement in the database copying efficiency.

Apart from this, the construction may be such that the connection relations extracted by the connection relations extraction device are stored on a non-volatile storage medium.

Here the non-volatile storage medium is for example a storage medium such as a hard disk unit which can hold the contents even if the power is interrupted.

With such a construction, then even if the connection relations extracted by the connection relations extraction device become large, since memory consumption of the computer system is restrained, demands on the hardware of the computer system can be alleviated. Moreover, even if during database copying the computer system goes down, since the connection relations are saved, the data can be recovered at the time of restarting.

A second solution device is characterized in that a database copy method comprises: a data copying step for partitioning a copy source database into predetermined regions, and copying records and inter-record connection relations contained in the respective regions to a copy target database; a connection relations extraction step for extracting from the copy source database the inter-record connection relations respectively contained in different regions; and a connection relations duplication step for duplicating the inter-record connection relations copied to the copy target database by the data copying step, based on the connection relations extracted by the connection relations extraction step.

With such a construction, copying of the database is performed as follows.
(1) The copy source database is partitioned into predetermined regions, and the records and the inter-record connection relations contained in the respective regions are copied to the copy target database.
(2) The inter-record connection relations respectively contained in different regions are extracted from the copy source database.
(3) The inter-record connection relations copied to the copy target database are duplicated based on the extracted connection relations.

Consequently, even when the inter-record connection relations extend to the whole database, the database copying for the partitioned region units is performed, after which the inter-record connection relations respectively contained in the different regions are duplicated. Therefore, the exclusive occupation of the database spanning a wide range as with the conventional technology becomes unnecessary, so that for example it becomes possible to perform database copying during operation of an on line system. Moreover, database copying can be efficiently performed irrespective of the database construction, so that generality related to database copying can be increased.

A third solution device is characterized in that a recording medium is recorded with a database copy program for realizing: a data copying function for partitioning a copy source database into predetermined regions, and copying records and inter-record connection relations contained in the respective regions to a copy target database; a connection relations extraction function for extracting from the copy source database the inter-record connection relations respectively contained in different regions; and a connection relations duplication function for duplicating the inter-record connection relations copied to the copy target database by the data copying function, based on the connection relations extracted by the connection relations extraction function.

Here, "recording medium" means any medium which allows reliable recording of various information and which also allows the reliable retrieval of the information as required; for example portable recording media such as magnetic tapes, magnetic disks, magnetic drums, IC cards and CD ROMs.

With such a construction, a database copy program for realizing a data copying function, a connection relations extraction function, and a connection relations duplication function is recorded on a recording medium. Consequently, with a recording medium on which the relevant program is recorded, a database copy apparatus according to the present invention can be easily constructed using a standard computer system.

Other objects and aspects of the present invention will become apparent from the following description of embodiments given in conjunction with the appended drawings.

BRIEF EXPLANATION OF THE DRAWINGS

FIG. 1 shows sections illustrating the theory of the present invention for the case where there is no updating of the database, being respective explanatory diagrams illustrating; section (A) a database storage structure of a copy source database, section (B) extraction data extracted from the copy source database, section (C) a set table generated based on the extraction data, and section (D) records and solved set information copied to a copy target database.

FIG. 2 shows sections illustrating the theory of the present invention for the case where there is updating of the database, being respective explanatory diagrams illustrating; section (A) a database storage structure of a copy source database, section (B) database update contents, section (C) records and solved set information copied to a copy target database, and section (D) the copy target database reflecting the update contents of the database.

FIG. 3 shows sections illustrating the theory of the present invention for the case where there is updating of the database, being respective explanatory diagrams illustrating;

section (A) extraction data extracted from the copy source database, section (B) the update difference generated corresponding to the update contents of the database, section (C) a set table generated based on the extraction data, and section (D) a set table updated by the update difference.

FIG. 4 shows sections illustrating an example of another data storage structure for which the present invention is applicable, section (A) showing a data storage structure for the source, and section (B) showing a data storage structure after data has been deleted.

FIG. 5 shows sections illustrating an example of another data storage structure for which the present invention is applicable, section (A) showing a data storage structure for the source, and section (B) showing a data storage structure after the data has been added.

FIG. 6 shows diagrams illustrating an example of another data storage structure for which the present invention is applicable, section (A) showing a data storage structure for the source, and section (B) showing a data storage structure after data has been deleted.

Figure 7:
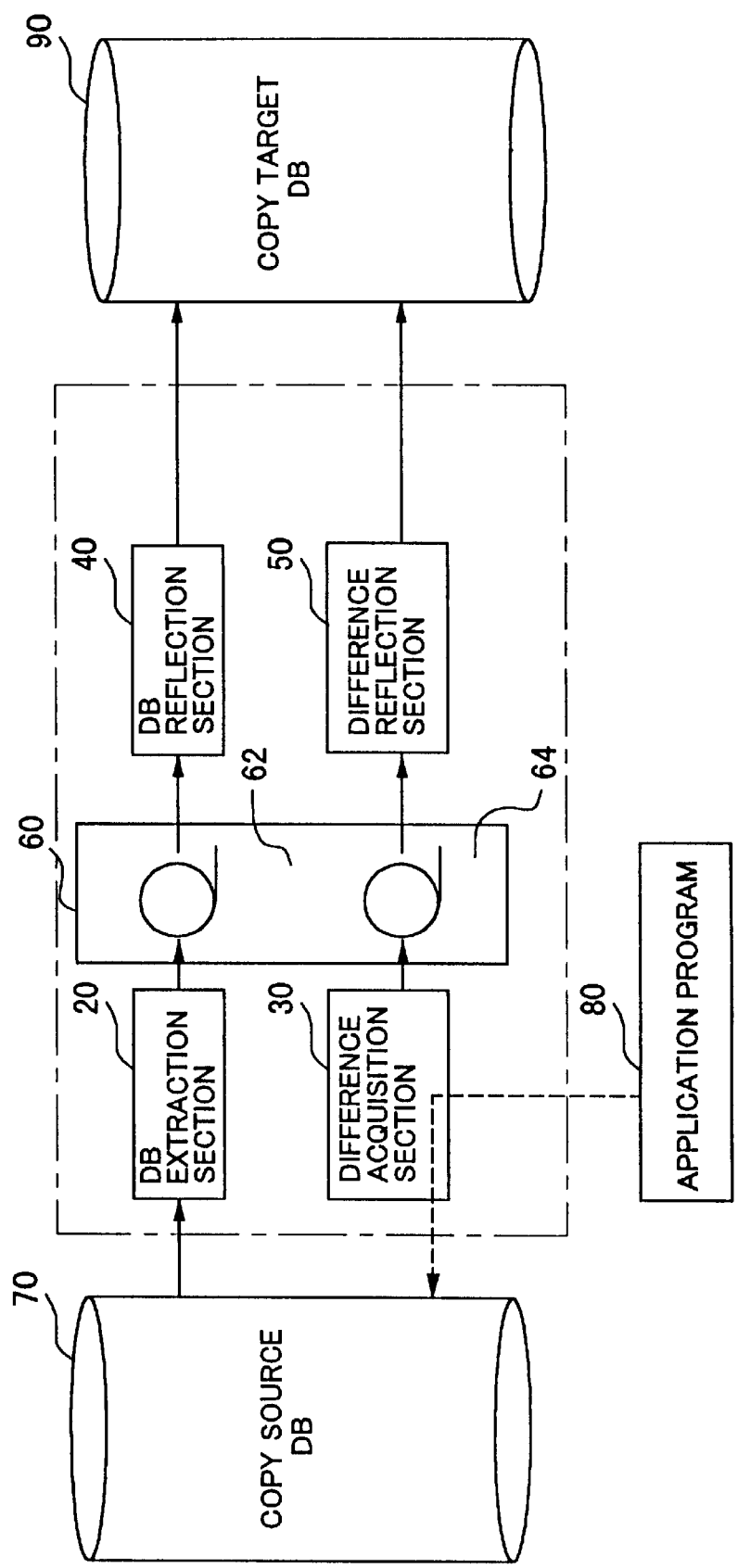
Figure 8:
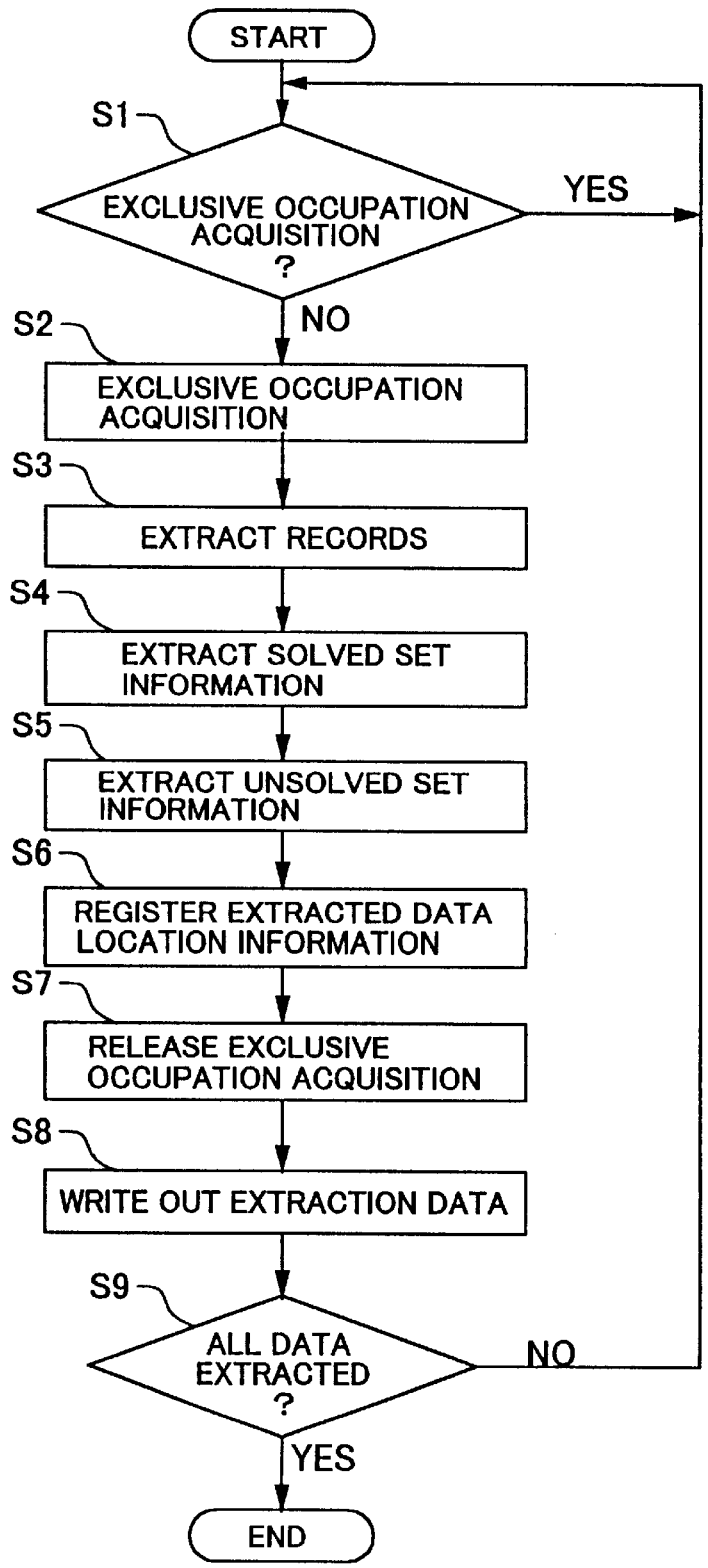
Figure 9:
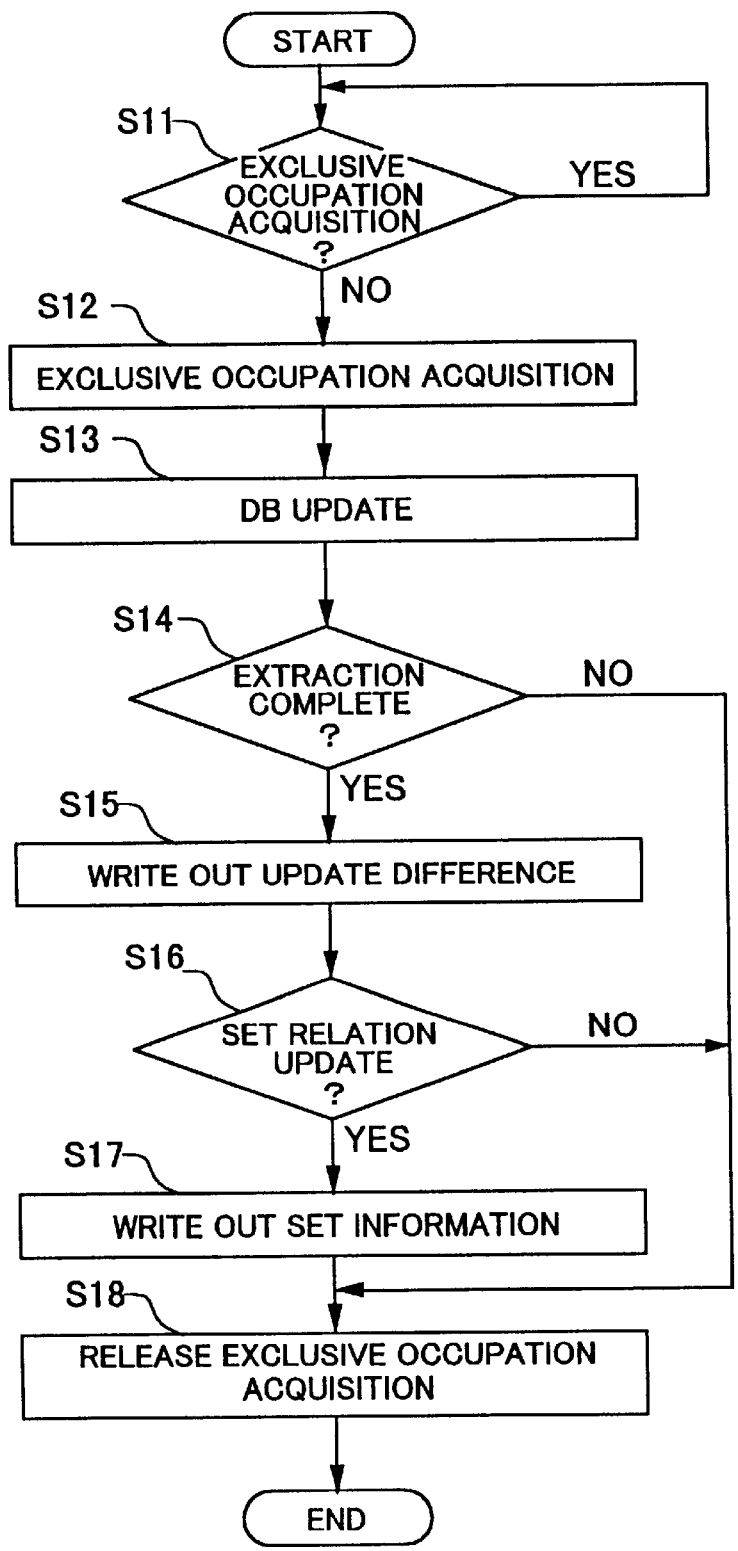
Figures 10, 11:
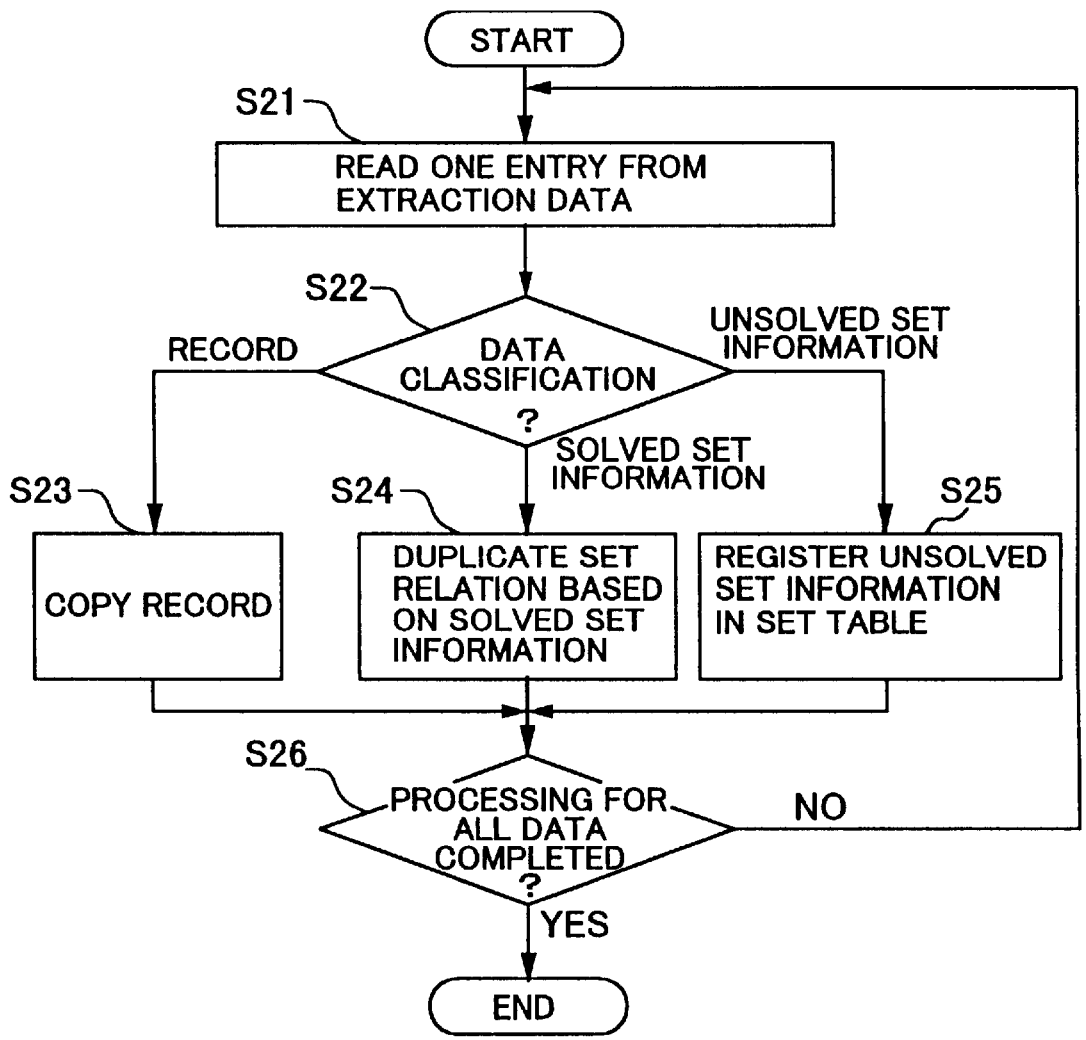
Figure 13:
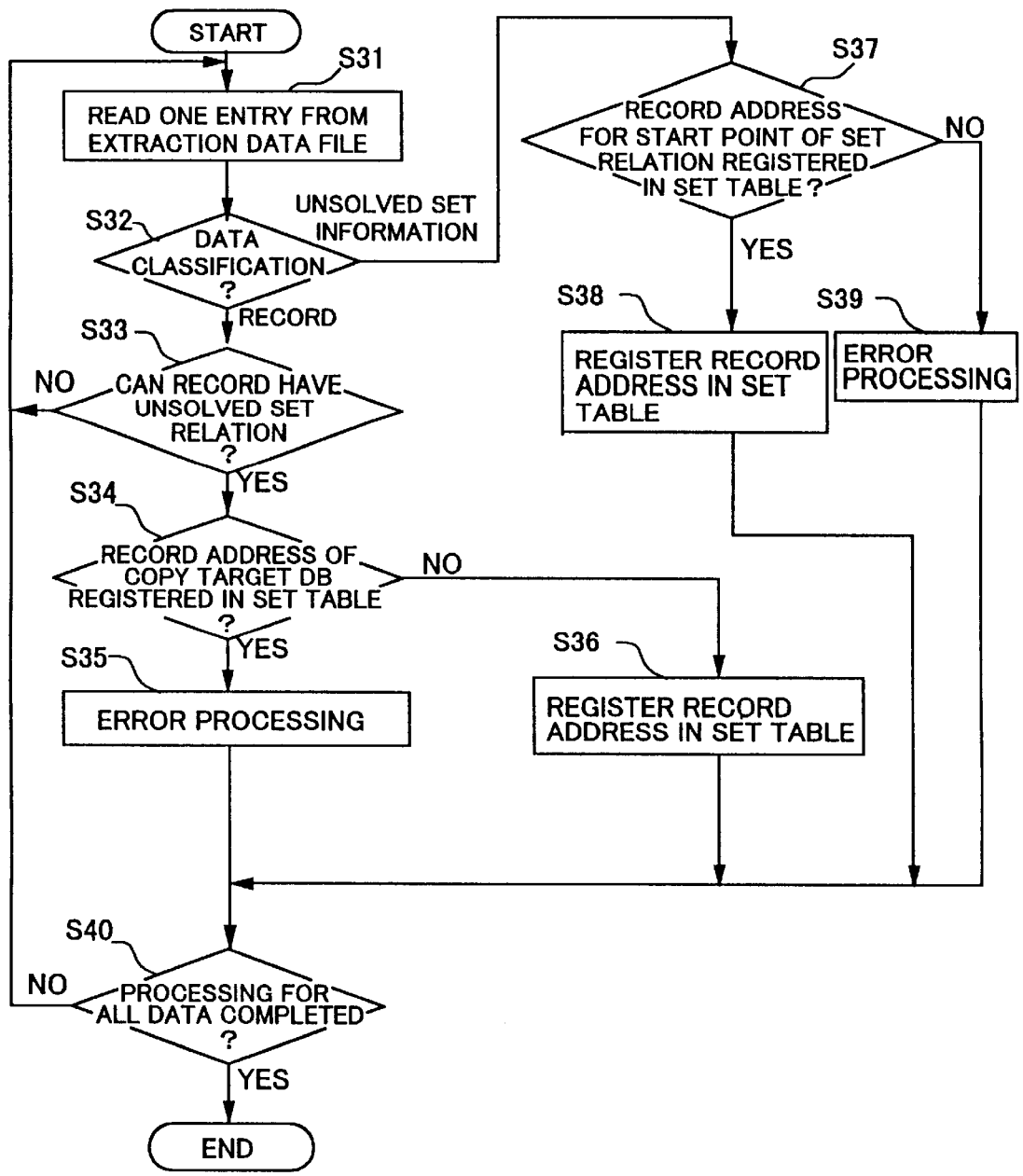
Figure 15:
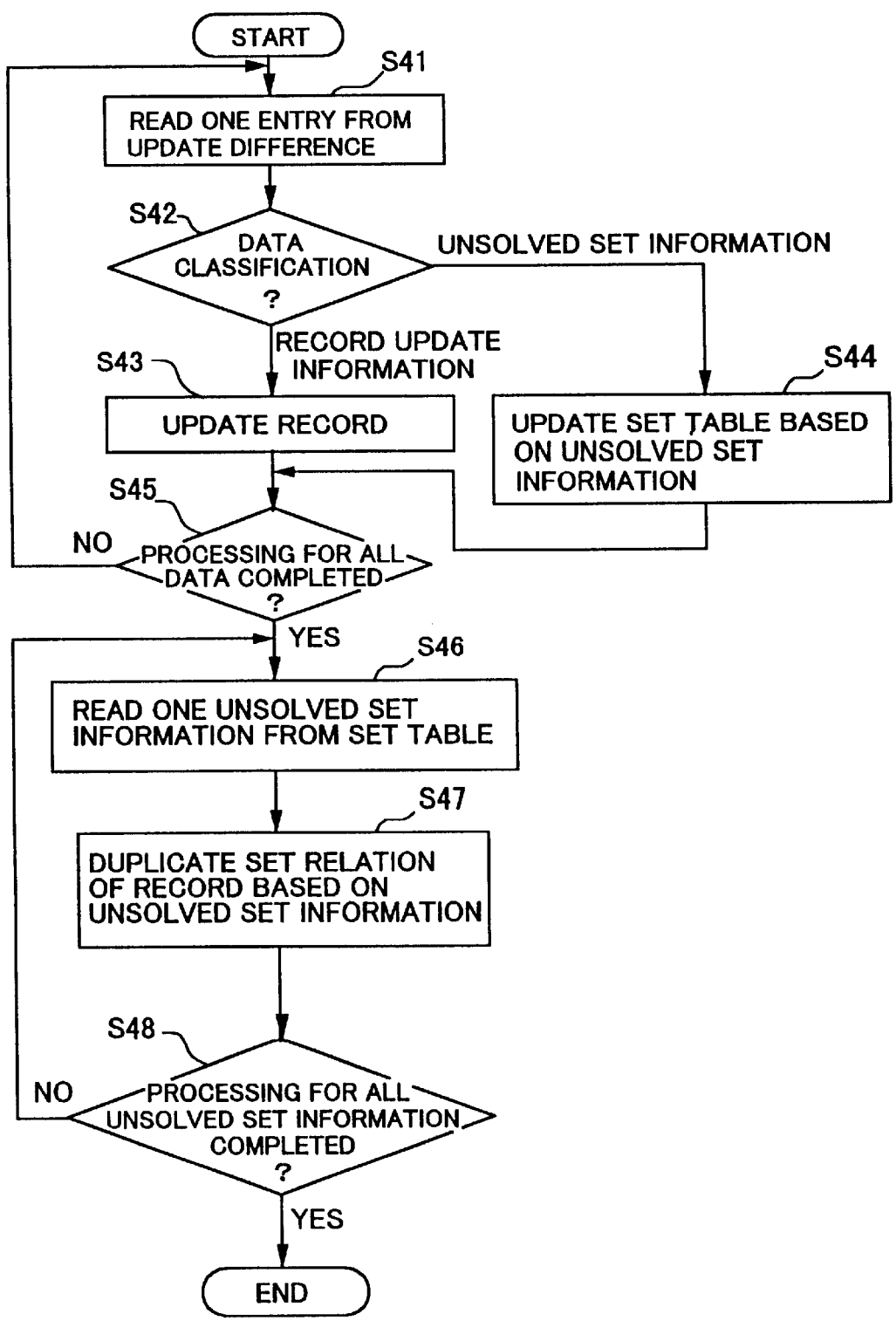
Figure 19:
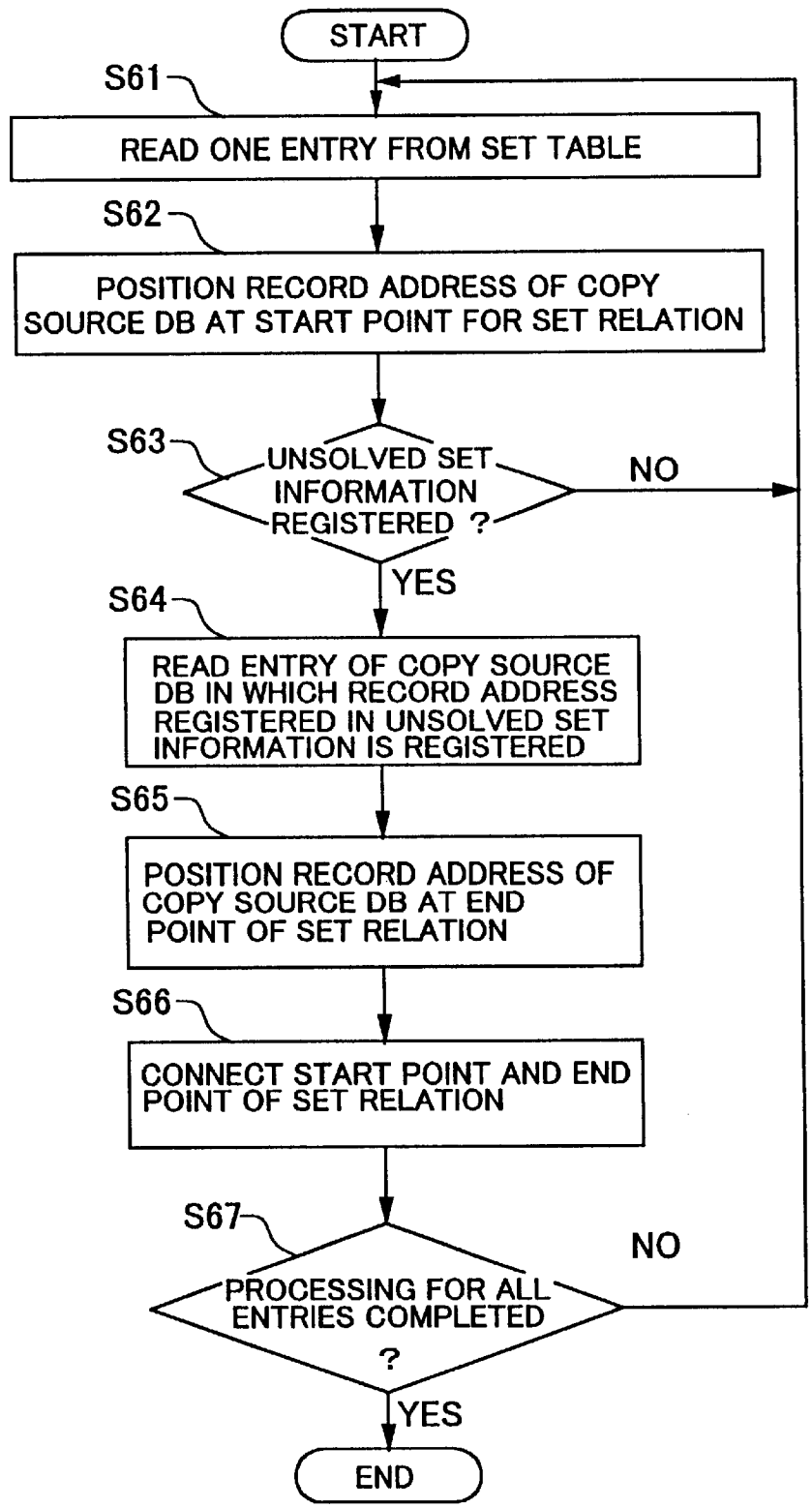
Figure 20:
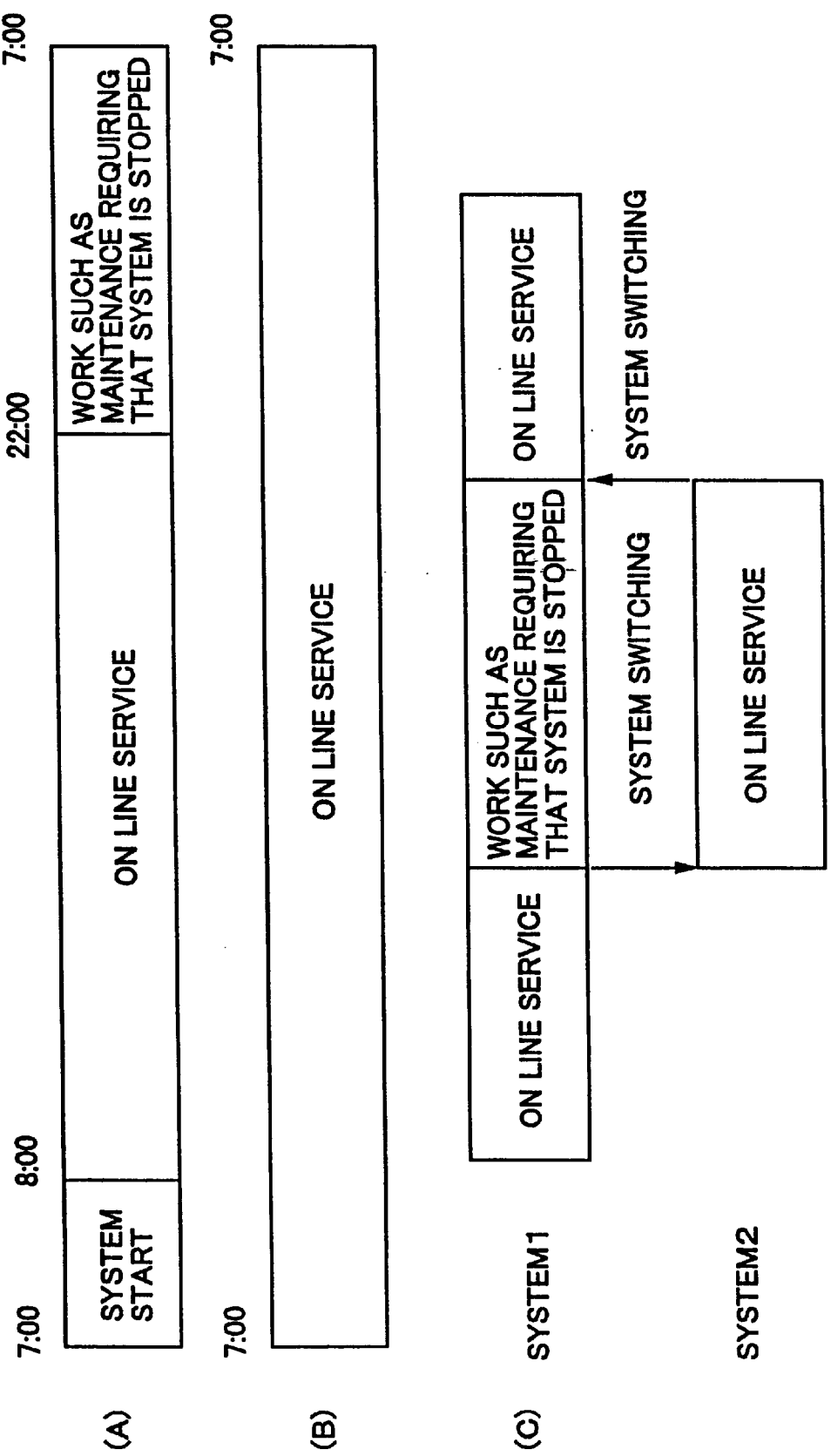
Figure 21:
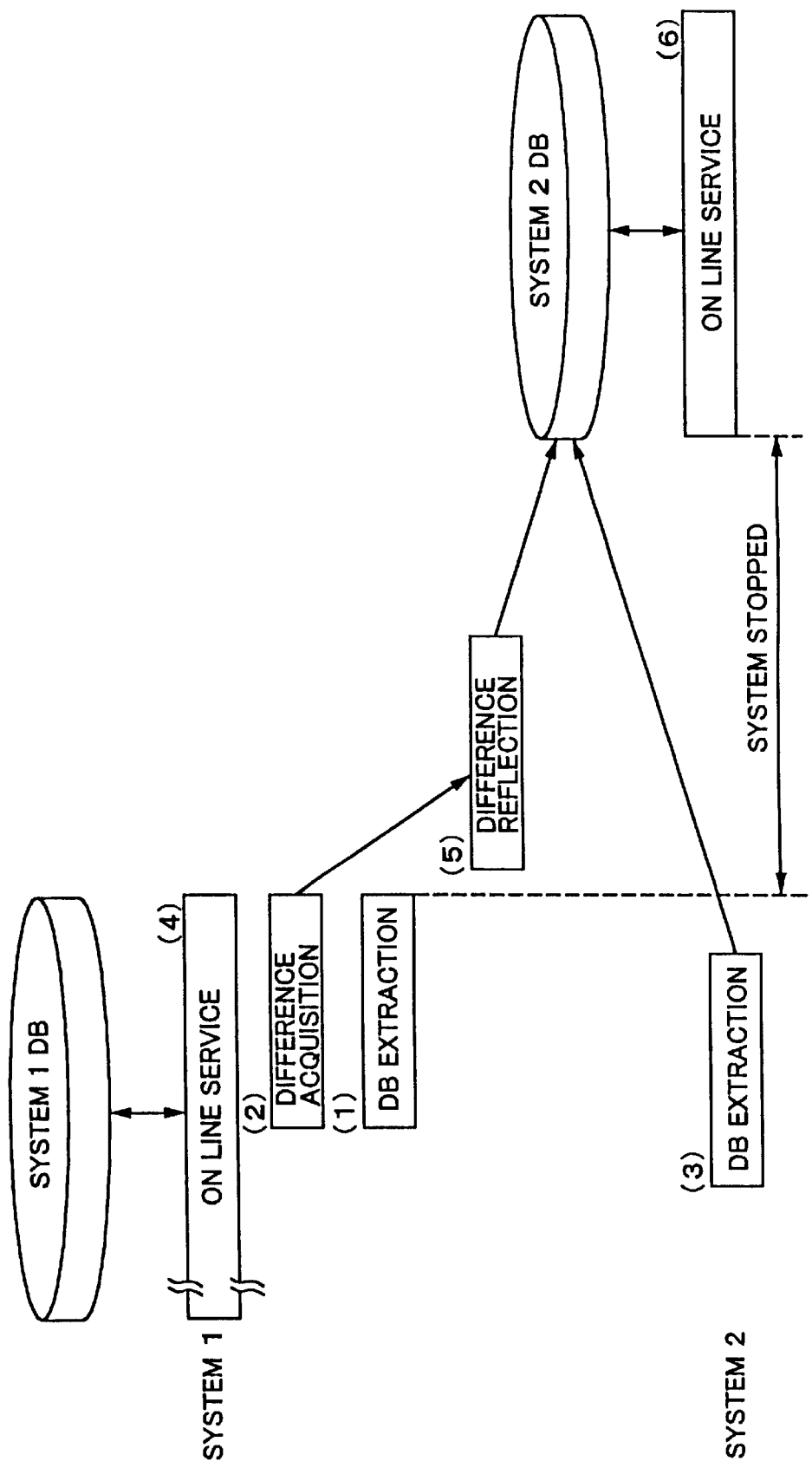

FIG. 7 is an overall structural diagram of a database copy apparatus according to the present invention;

FIG. 8 is a flow chart showing the processing contents in a DB extraction section;

FIG. 9 is a flow chart showing the processing contents in a difference acquisition section;

FIG. 10 is a flow chart showing the processing contents in a DB reflection section;

FIG. 11 is an explanatory diagram of a set table;

FIG. 12 is an explanatory diagram of extraction data;

FIG. 13 is a flow chart showing the contents of the processing for generating a set table;

FIG. 14 is a diagram showing a specific example of a set table generated by the set table generating processing;

FIG. 15 is a flow chart showing the contents of the processing in a difference reflection section;

FIG. 16 is a diagram showing a specific example of an update difference generated by the difference acquisition section;

FIG. 17 is a flow chart showing the contents of the processing for updating a set table;

FIG. 18 is a diagram showing a specific example of a set table updated by the set table update processing;

FIG. 19 is a flow chart showing the contents of the processing for duplicating a set relation;

FIG. 20 shows sections illustrating the problems of the conventional technology, being respective explanatory diagrams illustrating; section (A) the operating mode for executing maintenance and the like while the system is stopped, section (B) the operating mode with the system not stopped, and section (C) the operating mode for executing maintenance and the like by alternately switching between two systems;

FIG. 21 is a general explanatory diagram of the database copy processing for when the systems are switched.

FIG. 22 shows sections illustrating an example of when database copying cannot be performed in a short time with the conventional technology, being diagrams for respectively explaining specific examples of, section (A) the data structure for n:1 type, and section (B) the data structure for n:1 type; and FIG. 23 shows sections illustrating an example of when database copying cannot be performed in a short time with the conventional technology, being diagrams for respectively explaining, section (A) a logic structure, and section (B) a data storage structure.

DESCRIPTION OF THE PREFERRED EMBODIMENT

As follows is a detailed description of the present invention with reference to the appended drawings.

Before describing the present invention in detail, the problems with the conventional technology will be reviewed.

FIG. 20 shows an example of the operating mode of an on line system. With the conventional operation example, as shown in FIG. 20, section (A), during the period when the on line service is stopped (from 22:00 hours to 7:00 am the next day in the figure), work such as maintenance and the like requiring that the system is stopped is performed. However, if the operation becomes such that due to 24 hour service or the like, the on line system operates without stopping, then with one computer system, as shown in FIG. 20, section (B), work requiring that the system is stopped cannot be performed. Therefore, as shown in FIG. 20, section (C), two computer systems are used, and by switching the operation alternately between the systems then work requiring the system to be stopped is possible.

In order to alternately switch the two computer systems, then as mentioned before, database copying is required. The database copy process is described with reference to FIG. 21 as follows. DB copying is performed from the DB of system 1 to the DB of system 2.

(1) Prior to switching the system, data is extracted from the DB of system 1.

(2) Synchronized with the DB extraction, acquisition of the update differences for service requests with respect to system 1 is started.

(3) The extracted data is copied to the DB of system 2.

(4) The service of system 1 is stopped. Up to this point, the service is performed by the system 1, and the update difference is acquired.

(5) The DB of system 1 and the DB of system 2 are made equivalent to reflect the update difference. In this case, since there is only reflection of the update part after DB extraction, then the processing is completed in a short time, to the extent that the stoppage of the on line system is not known to the user.

(6) Since the DB of the system 1 and the system 2 are in an equivalent condition, the service can be restarted using the DB of the system 2.

With the DB copying using the conventional technology as described above, the data extraction range is exclusively occupied, and the data and the set relations within that range are extracted at a time. Therefore in the case where the set relations extend over the whole DB, DB updating in a short time is not possible. That is to say, in the case where the DB is of "n:1 type" as shown in FIG. 22, and this is a data storage structure as shown in FIG. 23, since there are set relations extending to the different storage locations, then the DB overall must be exclusively occupied With the DB in an on line system and the like, since this is generally a large scale, then in the case where the DB overall is exclusively occupied DB copying in a short time is not possible. Consequently, it becomes impossible to switch the computer system in a short time.

Next is a description of a method for solving these problems with the conventional technology.

FIG. 1 illustrates a DB copy method for the case where there is no DB updating during DB copying.

In the case where the copy source DB is a data storage structure such as shown in FIG. 1, section (A), extraction data such as shown in FIG. 1, section (B) is extracted from the copy source DB. The extraction data comprises records, solved set information and unsolved set information for each respective storage location. The records are a data body stored in the copy source DB, such as "base ball club", "first division", "Yamada", if the copy source DB is a data structure as shown in FIG. 22. The solved set information is information specifying the set relations which cannot have set relations extending between different storage locations. The unsolved set information is information specifying the set relations which can have set relations extending between different storage locations. If the extraction data can be extracted, then a set table (to be described in detail later) as shown in FIG. 1, section (C) is generated from the unsolved set information.

The records are copied to the copy target DB, and as shown in FIG. 1, section (D) the inter-record set relations copied based on the solved set information are duplicated. After this, when the unsolved set relations are duplicated based on the set table, a database structure having the same logic construction as in FIG. 1, section (A) is duplicated on the copy target DB.

Furthermore, in the case where there is DB updating during DB copying, then there is the DB copy method as shown in FIG. 2 and FIG. 3.

In the case where the copy source DB is a data storage structure as shown in FIG. 2, section (A), then as with the previous example, the extraction data as shown in FIG. 3, section (A) is extracted from the copy source DB. Here the case is considered for where as shown in FIG. 2, section (B), after extracting the data from the storage location 1 of the copy source DB and prior to data extraction from the storage location 2, record "b13" is added to the storage location 1. In this case, an update difference such as shown in FIG. 3, section (B) is acquired. The update difference comprises both the DB update information and the unsolved set information. Furthermore, the set table as shown in FIG. 3, section (C) is generated based on the unsolved set information.

Then, as with the previous example, the records are copied to the copy target DB, and as shown in FIG. 2. section (C) the inter-record set relations which have been copied based on the solved set information, are duplicated.

Incidentally, since the record "b13". is added to the storage location 1, then this must be reflected in the copy target DB. That is, when updating is performed for the copy target DB based on the DB update information for the update difference, then this becomes as in FIG. 2, section (D). Moreover, since the requirement arises for also modifying the set table with the DB updating, then when the set table is updated based on the unsolved set information for the update difference, the set table becomes as in FIG. 3. section (D). After this, when the unsolved set relations are duplicated based on the set table, a DB structure having the same logic structure of FIG. 2, section (A) is duplicated on the copy target DB.

Here, the present invention is applicable not only to the two cases described above but is also applicable to the cases as shown in FIG. 4 through FIG. 6. A simple explanation of the respective cases is as follows.

FIG. 4 shows the case for where there is data deletion with DB updating. That is, with a DB storage structure such as shown in FIG. 4, section (A), after extracting the data from the storage location 1 of the copy source DB, and prior to data extraction from the storage location 2, there is the case where as shown in FIG. 4, section (B), the record "b12" of the storage location 1 is deleted.

FIG. 5 shows the case for where in a DB of a structure for supervising the set relations in a pointer list, there is data addition with DB updating. That is, with a DB storage structure such as shown in FIG. 5, section (A), after extracting the data from the storage location 1 of the copy source DB, and prior to data extraction from the storage location 2, there is the case where as shown in FIG. 5. section (B), the record "b13" is added to the storage location 1.

FIG. 6 shows the case for where in a DB of a structure for supervising the set relations in a pointer list, there is data deletion with DB updating. That is, with a DB storage structure such as shown in FIG. 6, section (A), after extracting the data from the storage location 1 of the copy source DB, and prior to data extraction from the storage location 2, there is the case where as shown in FIG. 6, section (B), the record "b12" of the storage location 1 is deleted.

Next is a description of the specific construction for realizing the above described method.

FIG. 7 shows the overall structure of a DB copy apparatus according to the present invention. The DB copy apparatus is constructed on a computer incorporating at least a central processing unit (CPU) and a memory, and operates in software fashion following a program loaded into the memory.

A DB copy apparatus 10 as shown in FIG. 7 comprises; a DB extraction section 20, a difference acquisition section 30, a DB reflection section 40, a difference reflection section 50, and a file storage section 60 comprising a hard disk unit serving as a non volatile storage medium.

The DB extraction section 20 extracts extraction data from a copy source DB 70 in accordance with the flow chart shown in FIG. 8, and writes the extraction data into the file storage section 60 as an extraction data file 62. Here the DB extraction section 20 acts as part of; a data copying device, a data copying step, a data copying function, a connection relations extraction device, a connection relations extraction step, and a connection relations extraction function.

In step 1 (denoted as S1 in FIG. 8 with other steps similarly denoted), it is judged by the difference acquisition section 30 if the range for data extraction for the copy source DB 70 is being acquired as exclusive occupation. Then, if judged that the range for data extraction is being acquired as exclusive occupation, control waits until the exclusive occupation acquisition is released (YES). On the other hand, if judged that the range for data extraction is not being acquired as exclusive occupation, control proceeds to step 2 (NO). Here, the range for data extraction is for example a partial range of the DB shown by the rectangle in FIG. 2, section (A). Furthermore, the reason for waiting while the range for data extraction of the copy source DB 70 is being acquired as exclusive occupation, is so that data extraction is not performed when updating of the copy source DB 70 is performed with an application program 80, to thereby prevent conflict between the data of the copy source DB 70 and a copy target DB 90.

In step 2, the range for data extraction for the copy source DB 70 is acquired as exclusive occupation.

In step 3, the records are extracted from the copy source DB 70.

In step 4, the solved set information is extracted from the copy source DB 70.

Here the processing of step 3 and step 4 corresponds to a part of the data copying device, the data copying step, and the data copying function.

In step 5, the unsolved set information is extracted from the copy source DB 70. Here the distinction between the solved set relation and the unsolved set relation, can be judged for example by analyzing the DB structure definition. The processing of step 5 corresponds to one part of the connection relations extraction device, the connection relations extraction step and the connection relations extraction function.

In step 6, the extracted data location information for where the data is extracted from the copy source DB 70 (specifically, the address specifying the data storage location in the copy source DB 70) is written to the file storage section 60.

In step 7, the exclusive occupation acquisition for the range for data extraction of the copy source DB 70 is released.

In step 8, the records, the solved set information, and the unsolved set information extracted from the copy source DB 70 are written to the file storage section 60 as the extraction data file 62.

In step 9, it is judged if all the data from the copy source DB 70 has been extracted. Then, if judged that all data has been extracted, the processing in the DB extraction section 20 is terminated (YES), while if judged that all data has not been extracted, control returns to step 1 (NO).

The difference acquisition section 30 is started when there is a DB update request from the application program 80. Then, when the range for data update has been extracted from the copy source DB 70, the update difference is written to the file storage section 60 as an update difference file 64 in accordance with the flow chart of FIG. 9. Furthermore, the update difference file 64 is initialized to empty, when the DB copy apparatus 10 is started. Here the difference acquisition section 30 acts as the update difference acquisition device.

In step 11, it is judged by the DB extraction section 20 if the range for data update of the copy source DB 70 is being acquired as exclusive occupation. If judged that the range for data update is being acquired as exclusive occupation, control waits until the exclusive occupation acquisition is released (YES). On the other hand, if judged that the range for data update is not being acquired as exclusive occupation, control proceeds to step 12 (NO). Here the reason for waiting while the range for data update of the copy source DB 70 is being acquired as exclusive occupation, is the same as the reason for waiting as with the previous DB extraction section 20.

In step 12, the range for data update of the copy source DB 70 is acquired as exclusive occupation.

In step 13, updating of the copy source DB 70 is performed based on the DB update request from the application program 80.

In step 14 it is judged if the data in the range for data update of the copy source DB 70 has been extracted. Whether or not the data has been extracted can be judged by referring to the extracted data location information registered in the file storage section 60. Then, if judged that the data in the range for data update has been extracted, control proceeds to step 15 (YES), while if judged that the data has not been extracted, control proceeds to step 18 (NO).

In step 15, the update difference file 64 is written out to the file storage section 60.

In step 16, it is judged if the set relation has been updated due to the DB update request from the application program 80. Then, if judged that the set relation has been updated, control proceeds to step 17 (YES), and the set information is written out to the file storage section 60 as the update difference file 64. On the other hand, if judged that the set relation has not been updated, control proceeds to step 18 (NO).

Here the processing of step 14 through step 17 corresponds to the update difference acquisition device.

In step 18, the exclusive occupation acquisition for the range for data update in the copy source DB 70 is released.

The DB reflection section 40 reads the extraction data file 62 from the file storage section 60, and copies the records and solved set information to the copy target DB 90, and also registers the unsolved set information in the "set table" in accordance with the flow chart shown in FIG. 10. Here the set table, as shown in FIG. 11 comprises the address of the copy source DB, the address of the copy target DB and the unsolved set information. The DB reflection section 40 acts as part of; a data copying device, a data copying step, a data copying function, a connection relations extraction device, a connection relations extraction step, and a connection relations extraction function.

In step 21, one entry from the extraction data file 62 of the file storage section 60 is read.

In step 22, branch processing corresponding to the classification of the read data is performed. That is, if the data is a record, control proceeds to step 23 where the record is copied to the copy target DB 90. Moreover, if the data is solved set information, control proceeds to step 24 where the set relation for the record copied to the copy target DB 90 is duplicated based on the solved set information. Furthermore, if the data is unsolved set information, control proceeds to step 25 where the unsolved set information is registered in the set table. Details of the processing for the registering of the unsolved set information in the set table are given later.

Here the processing of step 23 and step 24 corresponds to one part of; the data copying device, the data copying step and the data copying function. Moreover, the processing of step 25 corresponds to one part of; the connection relations extraction device, the connection relations extraction step and the connection relations extraction function.

In step 26, it is judged if the processing of all data of the extraction data file 62 has been completed. Then, if judged that the processing of all data has been completed, the processing in the DB reflection section 40 is terminated (YES), while if judged that the processing of all data has not been completed, control returns to step 21 (NO) to perform the processing for the next entry.

Here the description is details of the processing in the DB reflection section 40, for registering the unsolved set information in the set table. In the following description, the examples of FIG. 2 and FIG. 3 are assumed.

Due to the function of the DB extraction section 20, extraction data such as shown in FIG. 12 is extracted from the copy source DB 70. The extraction data comprises; data classification, and record names and record addresses (in the case where the data classification is records), or start point and finish point addresses for the set relations (in the case where the data classification is unsolved set information). Furthermore, the solved set information is described by the order of the list of the entries. The generation of the set table is performed in accordance with the flow chart of FIG. 13.

In step 31, one entry is read from the extraction data file 62.

In step 32, branch processing corresponding to data classification is performed. That is, if the data is a record, control proceeds to step 33, while if the data is unsolved set information, control proceeds to step 37.

In step 33 where processing is performed for the case when the data is a record, it is judged if the record can have the unsolved set relation. Then, if judged that this can have the unsolved set relation, control proceeds to step 34 (YES), while if judged that this cannot have the unsolved set relation, control returns to step 31 (NO).

In step 34, the set table is retrieved with the record address of the copy source DB 70 as a key, to judge if the record address is registered in the set table. Then, if judged that the record address is registered in the set table, control proceeds to step 35 (YES), judging that a data conflict has occurred, and for example error processing is executed for displaying an error message. On the other hand, if judged that the record address is not registered in the set table, control proceeds to step 36 (NO), and the record addresses of the copy source DB 70 and the copy target DB 90 are registered in the set table.

In step 37 where the processing is performed for the case where the data is unsolved set information, the set table is retrieved with the record address (address of the copy source DB) for the start point of the set relation as the key, to judge if the record address is registered in the set table. Then, if judged that the record address is registered in the set table, control proceeds to step 38 (YES), and the record address which becomes the finish point for the set relation is registered in the set table. On the other hand, if judged that the record address is not registered in the set table, control proceeds to step 39 (NO), judging that a data conflict has occurred, and for example error processing is executed for displaying an error message.

In step 40, it is judged if the processing of all data has been completed. Then, if judged that the processing of all data has been completed, the processing for generating the set table is terminated (YES), while if judged that the processing of all data has not been completed, control returns to step 31 (NO) to perform the processing for the next entry.

With the processing of step 31 through step 40 as described above, as shown in FIG. 14, the unsolved set information is registered in the set table. In FIG. 14, the record addresses for the copy source DB and the copy target DB are represented by the same format, however in practice, since the records are logically copied, they are not limited to the same address.

The difference reflection section 50 reads the update difference file 64 from the file storage section 60, and performs data update in the copy target DB 90, and duplicates the unsolved set information based on the "set table" in accordance with the flow chart of FIG. 15. In the case where there is no requirement for DB updating from the application program 80, then data updating is performed based on an empty update difference file 64. In this way, in the case where there is no DB updating, then essentially data updating of the DB is not performed. Here the difference reflection section 50 acts as; a connection relations duplication device, a connection relations duplication step, a connection relations duplication function, a data update device, and a connection relations update device.

In step 41, one entry is read from the update difference file 64.

In step 42, branch processing corresponding to data classification is performed. That is, if the data is record update information, control proceeds to step 43, and record updating is performed for the copy target DB 90. On the other hand if the data is unsolved set information, control proceeds to step 44 where the set table is updated based on the unsolved set information. Details of the update processing for the set table are given later.

Here the processing of step 43 corresponds to the data update device. Moreover, the processing of step 44 corresponds to the connection relations update device.

In step 45, it is judged if the processing of all data in the update difference file 64 has been completed. If judged that the processing of all data has been completed, control proceeds to step 46 (YES), while if judged that the processing of all data has not been completed, control returns to step 41 (NO) to perform the processing for the next entry.

In step 46, one unsolved set information is read from the set table.

In step 47, the set relation for the record copied to the copy target DB 90 is duplicated based on the read unsolved set information. Details of the duplication processing for the set relation for the record are given later. Here the processing of step 47 corresponds to the connection relations duplication device, the connection relations duplication step and the connection relations duplication function.

In step 48, it is judged if the processing for all of the unsolved set information has been completed. Then, if judged that the processing for all of the unsolved set information has been completed, the processing in the difference reflection section 50 is terminated (YES), while if judged that the processing for all of the unsolved set information has not been completed, control returns to step 46 (NO) where the processing for the next unsolved set information is performed.

Here the description is of details of the processing in the difference reflection section 50, for updating the set table. In the following description, the examples of FIG. 2 and FIG. 3 are assumed.

Due to the function of the difference acquisition section 30, the update difference as shown in FIG. 16 is generated. The update difference comprises; data classification, and record names and record addresses (in the case where the data classification is record update information), or start point and finish point addresses for the set relations (in the case where the data classification is unsolved set information). The updating of the set table is performed in accordance with the flow chart of FIG. 17.

In step 51, one entry is read from the update difference file 64.

In step 52, branch processing corresponding to data classification is performed. That is, if the data is a record, control proceeds to step 53, while if the data is unsolved set information, control proceeds to step 57.

In step 53 where processing is performed for the case where the data is a record, it is judged if the record can have the unsolved set relation. Then, if judged that this can have the unsolved set relation, control proceeds to step 54 (YES), while if judged that this cannot have the unsolved set relation, control returns to 51 (NO).

In step 54, the set table is retrieved with the record address of the copy source DB 70 as a key, to judge if the record address is registered in the set table. Then, if judged that the record address is registered in the set table, control proceeds to step 55 (YES) where the unsolved set information is updated with the record address which becomes the finish point for the set relation. On the other hand, if judged that the record address is not registered in the set table, control proceeds to step 56 (NO), and the record address of the copy source DB 70 and the copy target DB 90 are registered in the set table.

In step 57 where the processing is performed for the case where the data is unsolved set information, the set table is retrieved with the record address for the start point of the set relation as a key, to judge if the record address is registered in the set table. Then, if judged that the record address is registered in the set table, control proceeds to step 58 (YES), where the unsolved set information is updated with the record address which becomes the finish point of the set relation. On the other hand, if judged that the record address is not registered in the set table, control proceeds to step 59 (NO), and the unsolved set information is disregarded.

In step 60, it is judged if the processing of all data has been completed. Then, if judged that the processing of all data has been completed, the processing for updating the set table is terminated (YES), while if judged that the processing of all data has not been completed, control returns to step 51 (NO) to perform the processing for the next entry.

With the processing of step 51 through step 60 as described above, the set table is updated as shown in FIG. 18. That is, the DB update contents for the application program 80 are reflected in the set table.

Next, details of the duplication processing in the difference reflection section 50, for the set relation based on the set table will be described with reference to the flow chart of FIG. 19. In the following explanation, the set relations between records are duplicated based on the set table of FIG. 18.

In step 61, one entry is read from the set table.

In step 62, the record address of the copy source DB 70 is positioned at the start point for the set relations.

In step 63, it is judged if the unsolved set information of the entry has been registered. If the unsolved set information has been registered, control proceeds to step 64 (YES), while if the unsolved set information has not been registered, control returns to step 61, and the processing for the next entry is performed.

In step 64, the set table is retrieved with the record address registered in the unsolved set information as a key, and the entry of the copy source DB 70 in which this record address is registered is read.

In step 65, the record address of the copy target DB 90 is positioned at the end point of the set relations.

In step 66, the start point and the end point of the set relations which have been positioned are connected, and the set relations between records are duplicated.

In step 67, it is judged if the processing for all entries of the set table has been completed. If judged that the processing for all entries has been completed, the duplication processing for the set relations is terminated (YES), while if judged that the processing for all entries has not been completed, control returns to step 61 (NO).

With the DB copy apparatus of the above-described construction, even when the inter-record connection relations extend to the whole database, the database copying for the partitioned region units is performed, after which the inter-record connection relations respectively contained in the different regions are duplicated. Therefore, the exclusive occupation of the database spanning a wide region as with the conventional technology becomes unnecessary, so that for example it becomes possible to perform database copying during operation of an on line system. Consequently, database copying can be efficiently performed irrespective of the database construction, so that generality related to database copying can be increased.

Moreover, when there is a database update request for the region of the copy source database in which the records and the inter-record connection relations have been copied, the update difference due to the database update request is acquired. Then, based on the acquired update difference, the records and the inter-record connection relations copied to the copy target database, and the inter-record connection relations respectively contained in the different regions are updated. After this, based on the inter-record connection relations contained in the updated different regions, the inter-record connection relations copied to the copy target database are duplicated. Consequently, even during database copying, it is possible for example to process database update requests from an application program, thus enabling application to various on line systems.

With the present embodiment, the set table is registered in the file storage section 60. However the construction may be such that the set table is registered in memory. However, with the set table, considering that this is generally of a large scale, and in consideration of data security when the system is down, then as with the present embodiment preferably this is registered on a non-volatile storage medium.

Moreover, with the present embodiment, with the set relation, a construction is adopted where this is duplicated after reflecting all of the update differences. However if this is duplicated after completion of DB extraction, then duplication may be carried out at an optional time. For example, a method is also considered for the processing completion judgment device, where the information to the effect that DB extraction has been completed is acquired during the update difference acquisition, and judgment is made when the difference reflection section recognizes this. In this case, since updating of the set table after DB extraction completion is obviated, there is the advantage that the efficiency is better than with the present embodiment.

If a program for realizing these functions is recorded onto portable recording media such as for example magnetic tape, magnetic disk, magnetic drum, IC card, CD ROM, the database copy program according to the present invention can be distributed to the market. Then, any person acquiring such recording media could easily construct a DB copy apparatus according to the present invention using a typical computer system.

We claim:

1. A database copy apparatus comprising:

data copying means for partitioning a copy source database into predetermined storage locations, and copying records and inter-record connection relations contained in the respective storage locations to a copy target database;

connection relations extraction means for extracting from said copy source database the inter-record connection relations respectively contained in different storage locations; and connection relations duplication means for duplicating the inter-record connection relations copied to the copy target database by said data copying means, based on the connection relations extracted by said connection relations extraction means.

2. A database copy apparatus according to claim 1 comprising:

update difference acquisition means for acquiring, when there is a database update request for the storage location of the copy source database in which the records and the inter-record connection relations. have been copied by said data copying means, an update difference due to said database update request;

data update means for updating records and inter-record connection relations which have been copied to the copy target database by said data copying means, based on the update difference acquired by said update difference acquisition means, and connection relations update means for updating connection relations extracted by said connection relations extraction means, based on the update difference acquired by said update difference acquisition means.

3. A database copy apparatus according to claim 1 wherein there is provided: processing completion judgment means for judging if processing of the copy source database by said data copying means and said connection relations extraction means has been completed, and when there is a database update request of the copy source database in which the records and the inter-record connection relations have been copied by said data copying means, update difference acquisition means for acquiring the update difference due to said database update request and said connection relations duplication means, when judged by said processing completion judgment means that the processing of the copy source database has been completed, duplicates and updates the inter-record connection relations copied to the copy target database by said data copying means, based on the connection relations extracted by said connection relations extraction means and the update difference acquired by said update difference acquisition means.

4. A database copy apparatus according to claim 1, wherein said connection relations extracted by said connection relations extraction means are stored on a non-volatile storage medium.

5. A database copy method comprising:

partitioning a copy source database into predetermined storage locations, and copying records and inter-record connection relations contained in the respective storage locations to a copy target database;

extracting from said copy source database the inter-record connection relations respectively contained in different storage locations; and duplicating the inter-record connection relations copied to the copy target database by said data copying step, based on the connection relations extracted by said connection relations extracting.

6. A recording medium on which is recorded a database copy program performing a process comprising:

partitioning a copy source database into predetermined storage locations, and copying records and inter-record connection relations contained in the respective storage locations to a copy target database;

extracting from said copy source database the inter-record connection relations respectively contained in different storage locations; and duplicating the inter-record connection relations copied to the copy target database by said data copying function, based on the connection relations extracted by said connection relations extracting.

7. A database copy apparatus comprising:

a data copying unit comprising a partitioning unit partitioning a copy source database into predetermined storage locations, and comprising a record copying unit copying records and inter-record connection relations contained in the respective storage locations to a copy target database;

a connection relations extraction unit extracting from said copy source database the inter-record connection relations respectively contained in different storage locations; and a connection relations duplication unit duplicating the inter-record connection relations copied to the copy target database by said data copying means, based on the connection relations extracted by said connection relations extraction means.

8. A method of duplicating a database comprising:

tracking relations between records in same storage locations of the database and also tracking relations between records in different storage locations of the database that are being copied by a database duplication process; and duplicating the database by applying to copies of the storage locations the tracked relations between records in same storage locations of the database and the tracked relations between records in different storage locations of the database.

9. A method of duplicating a database comprising:

partitioning the database storage locations;

copying the storage locations while the database remains online;

after copying a given storage location and while copying other storage locations, determining and copying a resolved set of relations of records that are interrelated within the given storage location and are not related to records in another storage location;

after copying the given storage location and while copying other storage locations, also determining and copying an unresolved set of relations of records that are related to records in another storage location;

responsive to the database receiving an update to records in the given storage location that has been copied, modifying the resolved and unresolved sets of relations of the given storage location that are related to the records; and applying the copied storage locations, resolved sets, and unresolved sets, to create a copy of the database.

* * * * *